US012746881B2

(12) United States Patent
Inbe

(10) Patent No.: US 12,746,881 B2
(45) Date of Patent: Sep. 29, 2026

(54) ATTACHMENT STRUCTURE OF ONBOARD STEREO CAMERA UNIT

(71) Applicant: SUBARU CORPORATION, Tokyo (JP)

(72) Inventor: Toshiyuki Inbe, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/895,615

(22) Filed: Sep. 25, 2024

(65) Prior Publication Data

US 2025/0115193 A1 Apr. 10, 2025

(30) Foreign Application Priority Data

Oct. 6, 2023 (JP) ................................ 2023-174469

(51) Int. Cl.
*B60R 11/04* (2006.01)
*B60R 11/00* (2006.01)

(52) U.S. Cl.
CPC ....... *B60R 11/04* (2013.01); *B60R 2011/0026* (2013.01); *B60R 2011/0042* (2013.01)

(58) Field of Classification Search
CPC ............ B60R 11/04; B60R 2011/0026; B60R 2011/0042
See application file for complete search history.

(56) References Cited

U.S. PATENT DOCUMENTS

2012/0081550 A1* 4/2012 Sewell .................. H04N 23/50 348/148
2016/0257265 A1 9/2016 Kageyama et al.
2019/0193649 A1 6/2019 Kataishi et al.
2021/0178985 A1* 6/2021 Takeda ................... B60R 11/00
2022/0105879 A1* 4/2022 Maeda .................... B60R 11/04

FOREIGN PATENT DOCUMENTS

JP 2016-159875 A 9/2016
WO 2018/055905 A1 3/2018

* cited by examiner

*Primary Examiner* — Patrick E Demosky
(74) *Attorney, Agent, or Firm* — TROUTMAN PEPPER LOCKE LLP

(57) ABSTRACT

An attachment structure of an onboard stereo camera unit comprises a bracket unit, a camera unit, one fitting-fixing mechanism, and engaging-holding mechanisms. The bracket unit is configured to be attached to a vehicle. The camera unit is configured to be mounted on the bracket unit and comprises at least camera devices in a left and right pair. The fitting-fixing mechanism is configured to fix the camera unit to the bracket unit. The engaging-holding mechanisms are configured to define a mounting posture of the camera unit and engage and hold the camera unit when the camera unit is attached to the bracket unit.

14 Claims, 12 Drawing Sheets

ATTACHMENT STRUCTURE OF ONBOARD STEREO CAMERA UNIT

CROSS-REFERENCE TO RELATED APPLICATION

The present application claims priority from Japanese Patent Application No. 2023-174469 filed on Oct. 6, 2023, the entire contents of which are hereby incorporated by reference.

BACKGROUND

The present disclosure relates to an attachment structure of an onboard stereo camera unit that acquires information about environment in front of a vehicle.

In recent years, advanced driver-assistance systems (ADAS) that assist drivers in driving have started to be mounted on vehicles. ADAS are driver-assistance systems for automatic braking, lane-line recognition, and the like. In ADAS, various onboard sensors that detect the distance to a vehicle in front, a captured image, and the like are well known as devices used for driver assistance. A stereo camera or the like is used as an onboard sensor.

For example, Japanese Unexamined Patent Application Publication (JP-A) No. 2016-159875 discloses an onboard camera attachment structure that suppresses an effect of disturbance light from within a vehicle on an onboard stereo camera. For example, International Patent Application Publication No. WO 2018/055905 A1 discloses an onboard imaging device that reduces an adverse effect due to the difference in thermal expansion between a bracket and an imaging unit that is a stereo camera.

SUMMARY

An aspect of the disclosure provides an attachment structure of an onboard stereo camera unit. The attachment structure includes a bracket unit, a camera unit, one fitting-fixing mechanism, and engaging-holding mechanisms. The bracket unit is configured to be attached to a vehicle. The camera unit is configured to be mounted on the bracket unit and comprises at least camera devices in a left and right pair. The fitting-fixing mechanism is configured to fix the camera unit to the bracket unit. The engaging-holding mechanisms are configured to define a mounting posture of the camera unit and engage and hold the camera unit when the camera unit is attached to the bracket unit.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

DETAILED DESCRIPTION

Figure 1:
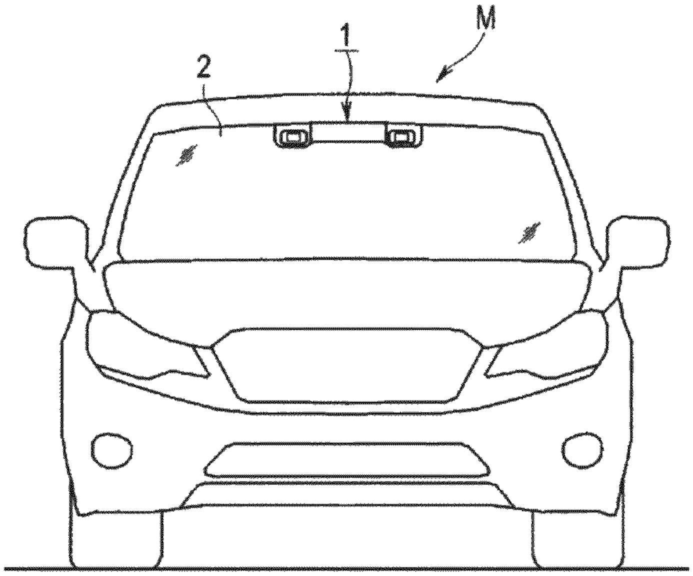
FIG. 1 is a front view of a vehicle in which an onboard stereo camera unit is provided.

An onboard stereo camera, such as those described in JP-A No. 2016-159875 and WO 2018/055905 A1, is attached, for example, to a windshield. The onboard stereo camera acquires depth information about of an object in front and the like by using two cameras.

If the positions of the two cameras relative to the vehicle body are only slightly displaced, an error occurs and such an onboard stereo camera cannot accurately measure information about the object. That is, regarding the onboard stereo camera, it is desirable to make the orientations and the distances of the two cameras relative to the vehicle body uniform. Therefore, it is desirable to attach the onboard stereo camera so that the positions of the two cameras may not be displaced relative to the vehicle body.

For example, the onboard stereo camera described in WO 2018/055905 A1 has a structure such that two members to be supported are fitted to brackets corresponding thereto. Therefore, the onboard stereo camera described in WO 2018/055905 A1 has a problem in that the positions of two cameras relative to the vehicle body may become displaced if one of the two members to be supported is attached to the bracket in a half-fitted state.

It is desirable to provide an attachment structure of an onboard stereo camera unit that can be easily attached without causing displacement of the positions of two cameras relative to a vehicle body and thus improves the workability of attaching a camera unit.

Referring to the drawings, an attachment structure of an onboard stereo camera unit according to an embodiment of the present disclosure will be described in detail. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Therefore, an embodiment of the present disclosure is not limited to the number of elements, the shapes of elements, the proportions of the sizes of elements, and the relative positional relationships among elements. In the following descriptions and the figures, the left and right directions are based on the forward direction as seen from the inside of the cabin of a vehicle.

Figure 2:
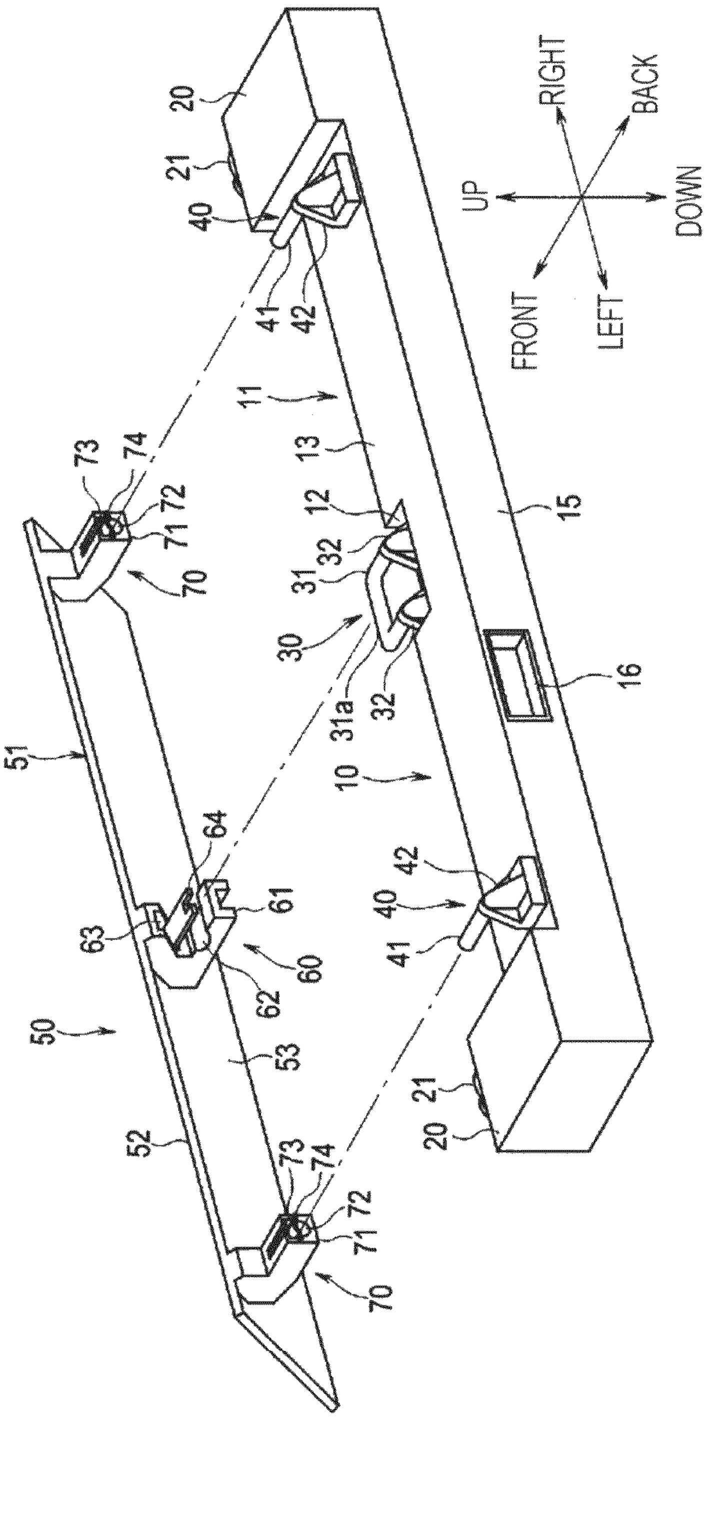
FIG. 2 is an exploded perspective view illustrating the configuration of the onboard stereo camera unit.
Figure 3:
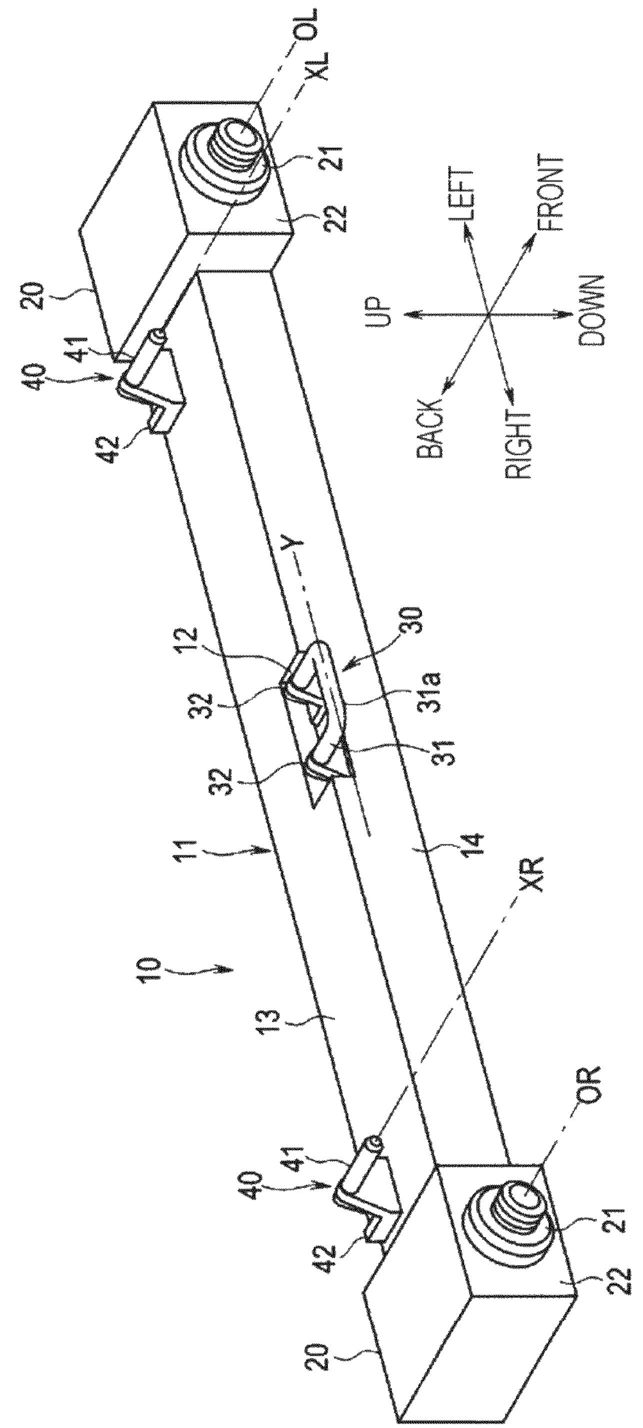
FIG. 3 is a front perspective view of a camera device.

As illustrated in FIG. 1, in a vehicle M, an onboard stereo camera unit 1 for recognizing driving environment in front is attached to an upper central position on the cabin side of a windshield 2. As illustrated in FIG. 2, the onboard stereo camera unit 1 includes a camera unit 10 and a bracket unit 50.

As illustrated in FIG. 3 to FIG. 6, the camera unit 10 includes a housing 11 having a substantially rectangular-parallelepiped outer shape. The housing 11 includes recesses/protrusions, a heat sink, and the like, which are heat dissipators (not shown). The housing 11 includes a pair of camera members 20 at both ends in the left-right direction. A camera device 21 is mounted in each of the camera members 20.

In the pair of left and right camera devices 21, optical systems having optical axes OR and OL are disposed adjacent to front surfaces 22 of the camera members 20. The pair of camera devices 21 are optically set so that the optical axes OR and OL are parallel.

That is, the pair of camera devices 21 capture an image of an object in front of the front surfaces 22 of the camera members 20. The pair of camera devices 21 constitute a stereo camera that calculates a distance and the like based on the principle of triangulation from the amount of parallax of the object whose image has been captured. The camera devices 21 are not limited to a pair of left and right camera devices constituting a stereo camera, and three or more camera devices may be provided in the camera unit 10.

The housing 11 has a recess 12, which is a cutout formed in an upper surface 13 and a front surface 14, at the central position in the left-right direction. A first attachment 30, which is a member to be fitted, is provided in the recess 12. That is, the first attachment 30 is disposed at the central position in an upper part of the housing 11.

The first attachment 30 includes a hook 31 having a U-shape (angular U-shape) and two bases 32 that are coupled to two back ends of the hook 31 to support the hook 31.

The hook 31 protrudes to a position that is above the upper surface 13 of the housing 11 and in front of the front surface 14. The hook 31 includes a column **31*a* that extends along an axis Y perpendicular to the optical axes OR and OL of the camera devices 21. Here, the column 31*a*** has a circular cross section.

The first attachment 30 may be integrally formed in the housing 11 by injection molding, or may be attached to the upper surface of the housing 11 by using a fastener such as a screw, an adhesive, or any appropriate fixing method.

A pair of second attachments 40, which are two members to be engaged, are provided on the upper surface 13 of the housing 11 near the camera members 20.

The second attachments 40 each include a rod 41, which has a bar-like shape with a circular cross section here, and a base 42, which supports the back end of the rod 41. Here, the rods 41 of the second attachments 40 extend along axes XR and XL that are parallel to the optical axes OR and OL of the camera devices 21. However, the axes XR and XL of the rods 41 and the optical axes OR and OL of the camera devices 21 need not be parallel.

The second attachments 40 also may be integrally formed in the housing 11 by injection molding, or may be attached to the upper surface of the housing 11 by using a fastener such as a screw, an adhesive, or any appropriate fixing method.

In this way, in the camera unit 10, the first attachment 30, which is a member to be fitted at the central position in the left-right direction, and the two second attachments 40, which are a pair of left and right members to be engaged, are provided in the housing 11.

Figure 4:
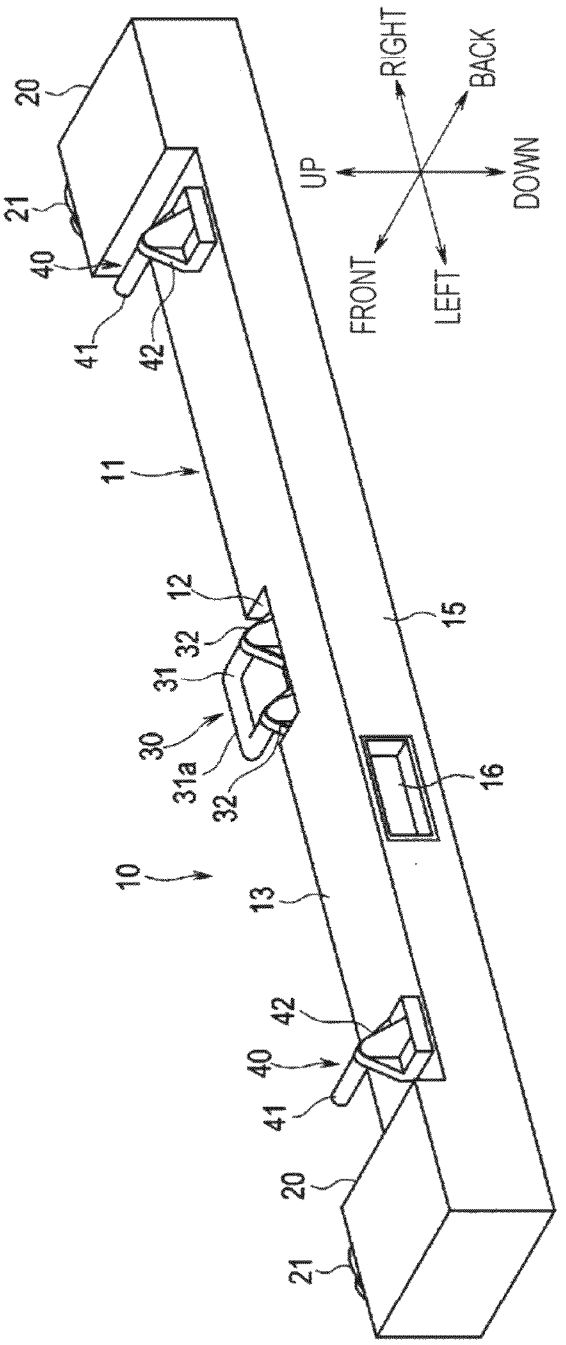
FIG. 4 is a rear perspective view of the camera device.
Figure 5:
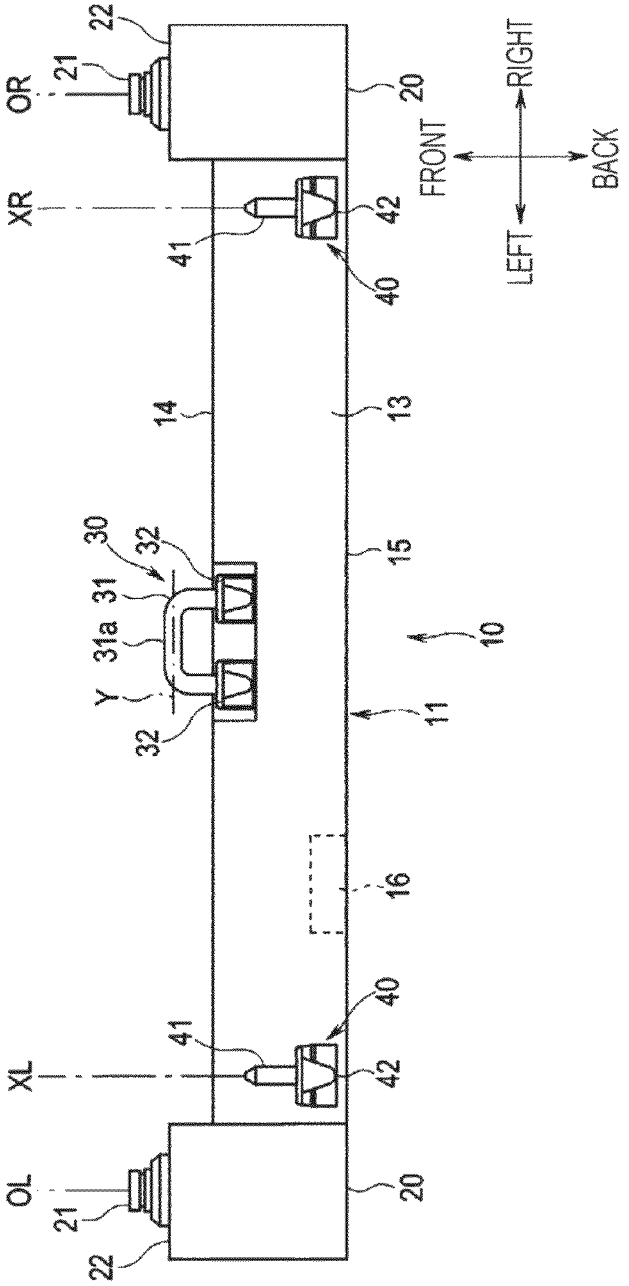
FIG. 5 is a plan view of the camera device.
Figure 6:
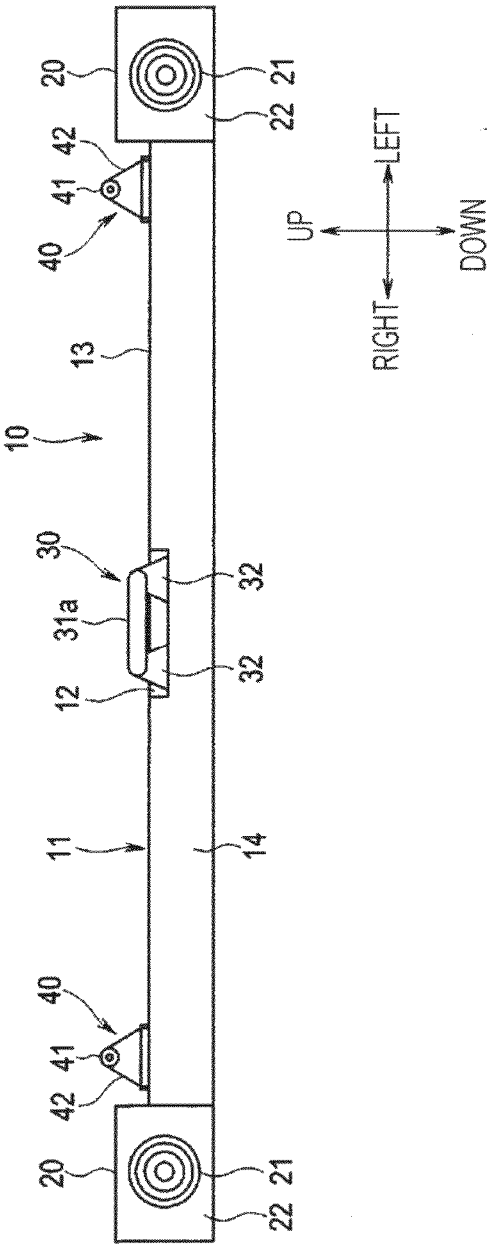
FIG. 6 is a front view of the camera device.

As illustrated in FIG. 4 and FIG. 5, an electric connector 16, which is a receptacle, is provided in a back surface 15 of the housing 11. To the electric connector 16, a connector plug of a cable (not shown), through which electric power is supplied to and image signals and the like are sent to or received from the camera devices 21, is coupled.

Figure 10:
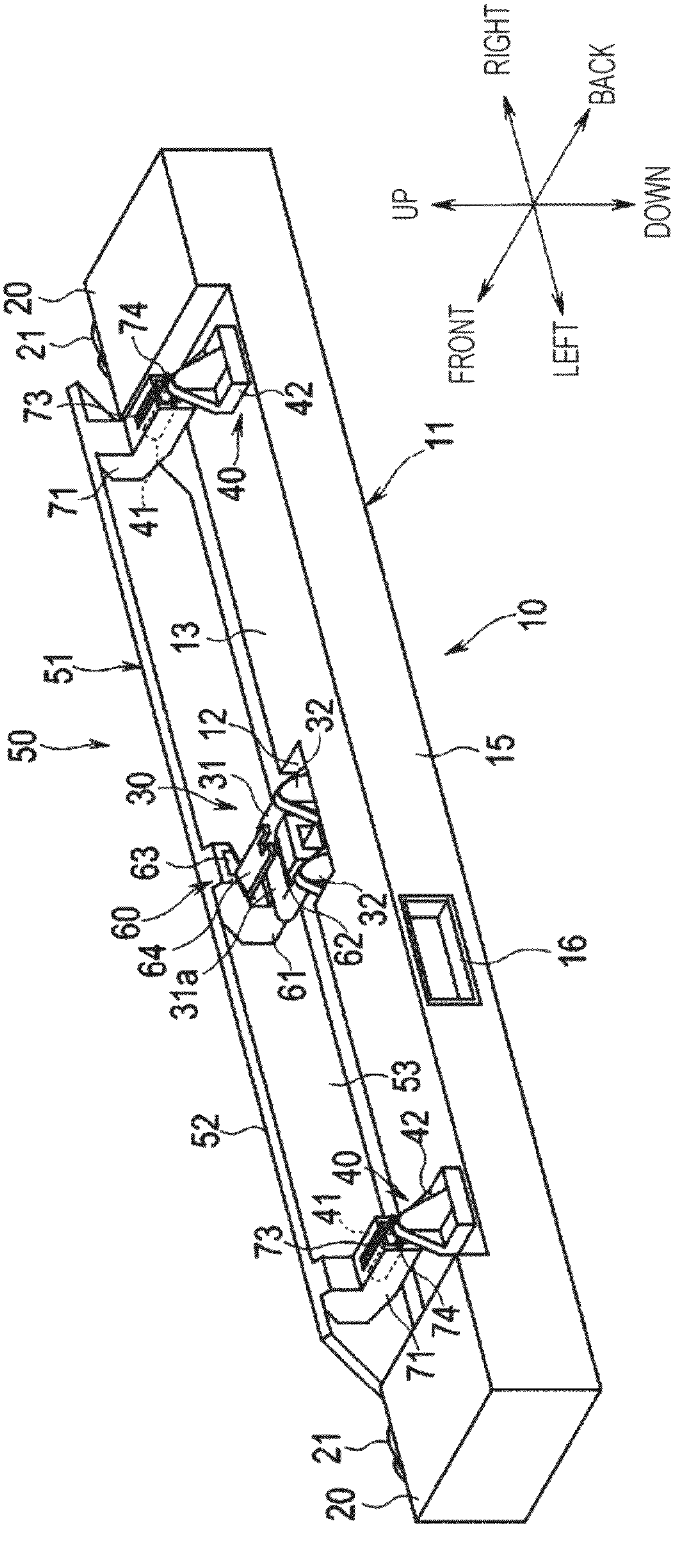
FIG. 10 is a perspective view of the onboard stereo camera unit in which the camera device is mounted on the bracket unit.

The camera unit 10 configured as described above is mounted and fixed to the bracket unit 50 (see FIG. 10). The bracket unit 50 is affixed and fixed to an upper central position on the cabin side of the windshield 2 by using a double-sided tape or the like. A front surface 52 side of a frame plate 51 of the bracket unit 50 is affixed to the windshield 2.

Figure 7:
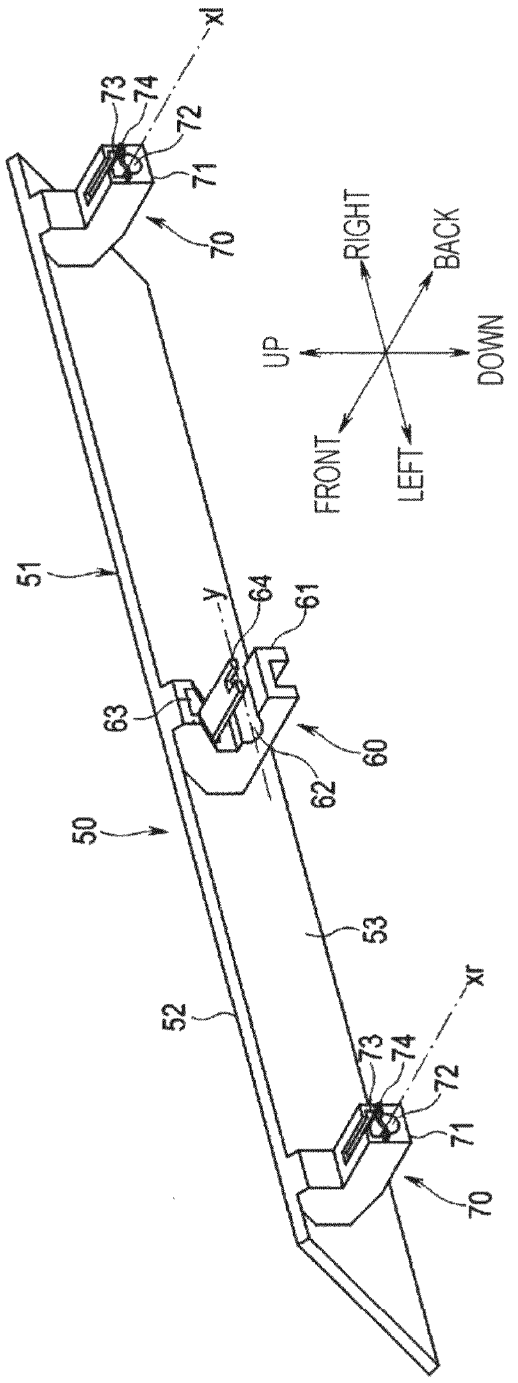
FIG. 7 is a rear perspective view of a bracket unit.

As illustrated in FIG. 7, the bracket unit 50 includes the frame plate 51, a first bracket 60 that fits and fixes the first attachment 30, and a pair of left and right second brackets 70 that engage and hold the second attachments 40.

Figure 8:
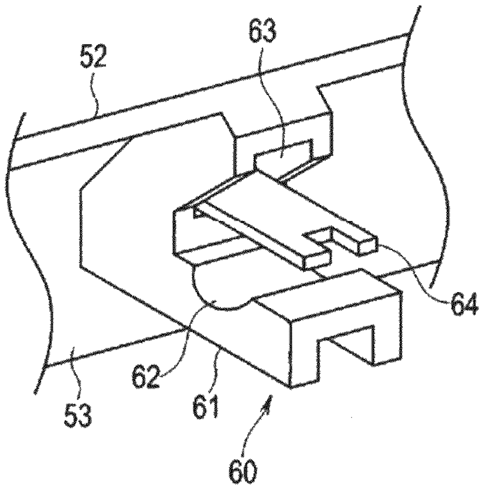
FIG. 8 is a perspective view of a first bracket.

The first bracket 60 is provided at a central upper position in the left-right direction of the frame plate 51. As illustrated in FIG. 8, the first bracket 60 includes a receiving block 61, which is an attachment supporter, and a plate spring 64, which is an attachment pressor.

The receiving block 61 is integrally formed by injection molding or the like at a central upper position of a back surface 53 of the frame plate 51 on the cabin side. The receiving block 61 may be fixed to the back surface 53 of the frame plate 51 by using a fastener such as a screw, an adhesive, or the like.

The receiving block 61 extends backward from the back surface 53 of the frame plate 51 toward the cabin side. The receiving block 61 has a groove-shaped recess 62, which extends in the left-right direction, in an upper surface of a part thereof extending backward.

The column **31*a* of the hook 31 of the first attachment 30 fits into the recess 62 when the camera unit 10 is mounted and fixed to the bracket unit 50 (see FIG. 10). The recess 62 is a groove that is similar to an outer surface of the column 31*a*. The recess 62 is formed along an axis y that is parallel to the axis Y along which the column 31*a*** extends.

The plate spring 64 is accommodated in a groove 63 formed in an upper part of the receiving block 61. The plate spring 64 is supported in the groove 63 and extends to cover an area above the recess 62.

When the camera unit 10 is fixed to the bracket unit 50, the plate spring 64 receives the column **31*a* of the hook 31 of the first attachment 30 and presses the column 31*a* toward the recess 62 of the receiving block 61. Thus, the first attachment 30 is fitted and fixed to the first bracket 60**.

Figure 9:
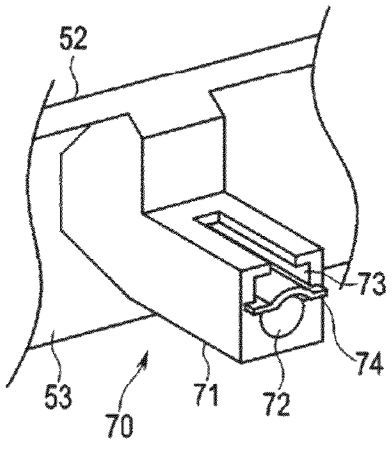
FIG. 9 is a perspective view of a second bracket.

The pair of left and right second brackets 70 are provided at left and right upper positions of the frame plate 51. As illustrated in FIG. 9, the second brackets 70 each include a receiving block 71, which is an attachment supporter, and a plate spring 74, which is an attachment pressor.

As with the first bracket 60, the receiving blocks 71 are integrally formed by injection molding or the like at upper left and right positions of the back surface 53 of the frame plate 51 on the cabin side. The receiving blocks 71 each may also be fixed to the back surface 53 of the frame plate 51 by using a fastener such as a screw, an adhesive, or the like.

Each receiving block 71 extends backward from the back surface 53 of the frame plate 51 toward the cabin side. The receiving block 61 has a hole 72, which extends in the front-back direction, in a part thereof extending backward. The hole 72 has an arc-like cross-sectional shape similar to the circular cross-sectional shape of the rod 41 of the second attachment 40.

A middle portion of the plate spring 74 along the longitudinal direction has an arc-like cross-sectional shape. The arc-like cross-sectional shape of the plate spring 74 is similar to the circular cross-sectional shape of the rod 41 of the second attachment 40.

The plate spring 74 is accommodated in a groove 73 formed in an upper part of the receiving block 71. The plate spring 74 is supported in the groove 73 and disposed to cover an area above the hole 72.

When the camera unit 10 is fixed to the bracket unit 50 (see FIG. 10), the plate spring 74 presses the rod 41 of the second attachment 40, which is inserted into the hole 72 of the receiving block 71, toward the hole 72. Thus, the second attachment 40 is engaged and held by the second bracket 70.

The camera unit 10 is mounted onto the bracket unit 50 along the axes XR and XL, which are the longitudinal axes of the rods 41. That is, the axes XR and XL of the rods 41 of the second attachments 40 are set to extend in the mounting direction in which the camera unit 10 is mounted onto the bracket unit 50.

The holes 72 of the receiving blocks 71 of the second brackets 70 have hole axes xr and xl that are parallel to the axes XR and XL of the rods 41. The hole axes xr and xl of the holes 72 are set to coincide with the axes XR and XL of the rods 41 when the camera unit 10 is mounted on the bracket unit 50. That is, here, the hole axes xr and xl of the holes 72 are also set to be parallel to the optical axes OR and OL of the camera devices 21. However, the hole axes xr and xl of the holes 72 need not be parallel to the optical axes OR and OL of the camera devices 21.

The bracket unit 50 is disposed on the frame plate 51 at a position such that the first bracket 60 corresponds to the first attachment 30 and the pair of left and right second brackets 70 correspond to the pair of left and right second attachments 40.

In this way, the bracket unit 50 includes the following three holders on the frame plate 51: the first bracket 60, which is a fitting member at the central position in the left-right direction; and the two second brackets 70, which are a pair of left and right engaging members.

As described above, regarding the onboard stereo camera unit 1, in the attachment structure for mounting and fixing the camera unit 10 to the bracket unit 50, the first attachment 30 of the camera unit 10 is fitted and fixed to the first bracket 60 of the bracket unit 50.

Moreover, regarding the onboard stereo camera unit 1, in the attachment structure for mounting and fixing the camera unit 10 to the bracket unit 50, the pair of left and right second attachments 40 of the camera unit 10 are inserted into the second brackets 70 of the bracket unit 50 in the mounting direction, and are engaged and held by the second bracket 70.

In this way, the attachment structure of the onboard stereo camera unit 1 according to the present embodiment includes, when the camera unit 10 is mounted on the bracket unit 50, a fitting-fixing mechanism that is constituted by the first attachment 30 and the first bracket 60 at one central position, and an engaging-holding mechanism that is constituted by the second attachments 40 and the second brackets 70 at left and right two positions.

With the attachment structure of the onboard stereo camera unit 1, in the direction in which the camera unit 10 is mounted onto the bracket unit 50, the second attachments 40 provided at the left and right two positions are inserted into the second brackets 70, and the first attachment 30 provided at the one central position in the left-right direction are fitted and fixed to the first bracket 60.

That is, in the attachment structure of the onboard stereo camera unit 1, the engaging-holding mechanisms at the left and right two positions define the mounting direction of the camera unit 10. That is, the mounting posture of the camera unit 10 when mounted is guided as the rods 41 of the second attachments 40 are inserted into the holes 72 of the second brackets 70. Therefore, the posture of the camera unit 10 when mounted on the bracket unit 50 is stabilized, and the fitting-fixing mechanism at the one central position in the left-right direction does not easily become half-fitted.

The fitting-fixing mechanism is configured as follows: the column 31*a* of the hook 31 of the first attachment 30, which is a member to be fitted, is fitted into the recess 62 formed in the receiving block 61 of the first bracket 60, which is a fitting member; and the plate spring 64 provided on the receiving block 61 presses the column 31*a* so that the column 31*a* may not be removed from the recess 62.

Due to this configuration, the first attachment 30 of the camera unit 10 is fitted and fixed to the first bracket 60 of the bracket unit 50. Thus, the camera unit 10 is fixed to the bracket unit 50. Here, the term "fitted" means that the recess and the protrusion of the recess 62 and the column 31*a* are joined together to be coupled and fixed.

The engaging-holding mechanism is configured as follows: the rods 41 of the second attachments 40, which are corresponding members to be engaged, are inserted into the holes 72 formed in the receiving blocks 71 of the second brackets 70, which are engaging members; and the plate springs 74 provided in the receiving blocks 71 are pressed against the rods 41 so that the rods 41 may not be pulled out from the holes 72.

Due to this configuration, the second attachments 40 of the camera unit 10 are engaged and held by the second brackets 70 of the bracket unit 50. Thus, the posture of the camera unit 10 relative to the bracket unit 50 is defined. The "engaged" here means that the rods 41 are inserted into the holes 72 to be coupled and held.

With the attachment structure of the onboard stereo camera unit 1, in a coaxial state in which the axes XR and XL of the rods 41 of the second attachments 40 and the hole axes xr and xl of the holes 72 of the second brackets 70 coincide with each other, the camera unit 10 is mounted onto the bracket unit 50 along the axes XR and XL and the hole axes xr and xl.

The attachment structure of the onboard stereo camera unit 1 is attached in such a way that the optical axes OR and OL of the pair of camera devices 21, which constitute a stereo camera, are accurate relative to the vehicle M, because the axes XR and XL of the rods 41 and the hole axes xr and xl of the holes 72 are respectively set parallel to the optical axes OR and OL of the camera devices 21.

Therefore, the attachment structure of the onboard stereo camera unit 1 can be easily attached without causing displacement of the optical axes OR and OL of the camera devices 21, which are provided in the camera unit 10, relative to the vehicle body of the vehicle M, and thus workability improves.

From the above, the attachment structure of the onboard stereo camera unit 1 according to the present embodiment can be easily attached without causing displacement of the positions of the two cameras relative to the vehicle body of the vehicle M, and can improve workability of attaching the camera unit 10 to the bracket unit 50.

After the camera unit 10 has been mounted on the bracket unit 50, a connector plug (not shown) is coupled to the electric connector 16. Then, a cosmetic cover (not shown) is attached to the camera unit 10 and the bracket unit 50 to integrally cover these.

Modification

Figure 11:
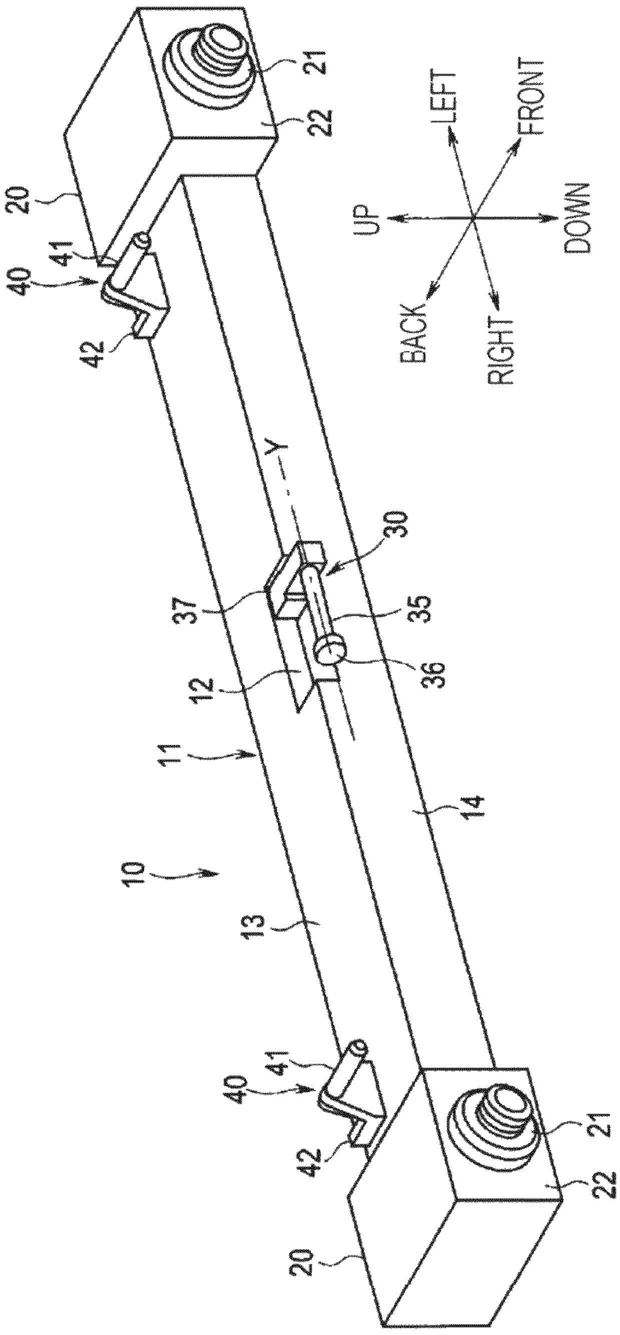
FIG. 11 is a front perspective view of a camera device according to a modification.
Figure 12:
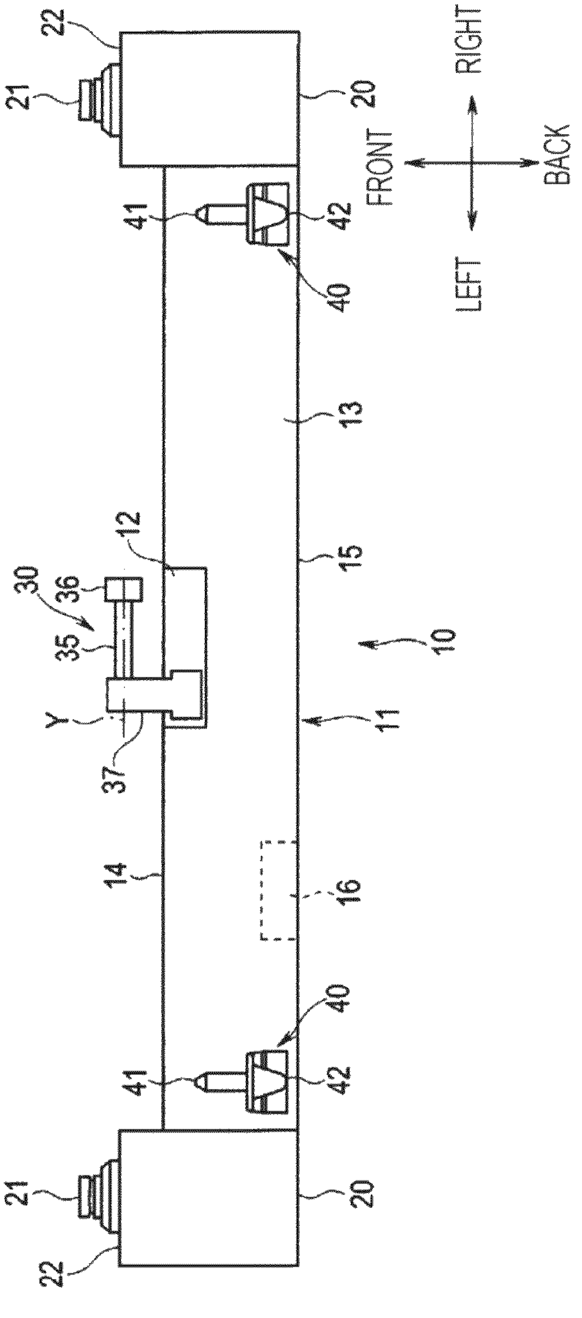
FIG. 12 is a plan view of the camera device according to the modification.

The first attachment 30, which is provided in the housing 11 of the camera unit 10, need not be U-shaped, and may be, for example, L-shaped as illustrated in FIG. 11 and FIG. 12.

The first attachment 30 according to the present modification is provided in the housing 11, and a bar-shaped hook 35 extends along the Y axis from a side surface of a base 37 that extends forward. A disk-shaped head 36 is formed at an end of the hook 35.

Figure 13:
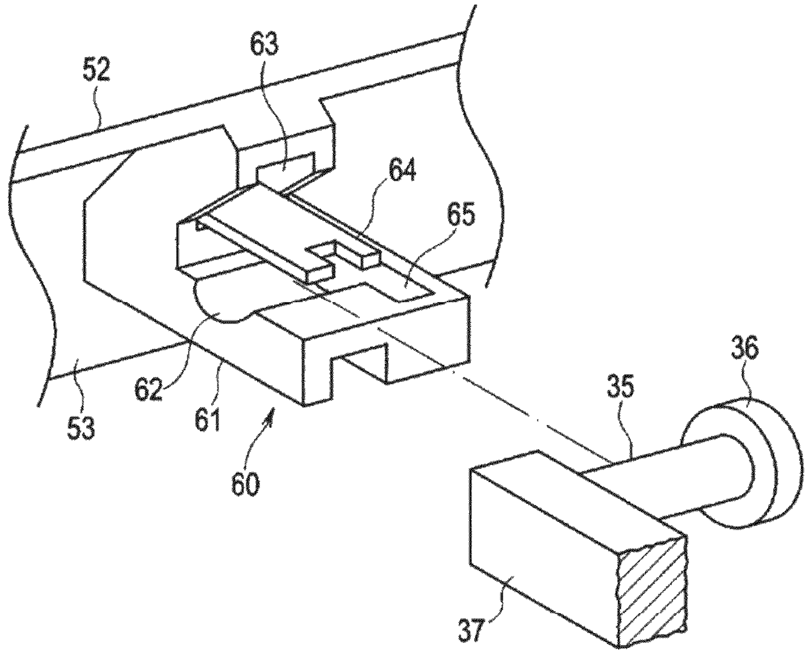
FIG. 13 is an exploded perspective view illustrating a state before a first attachment according to the modification is fitted and fixed to a first bracket.
Figure 14:
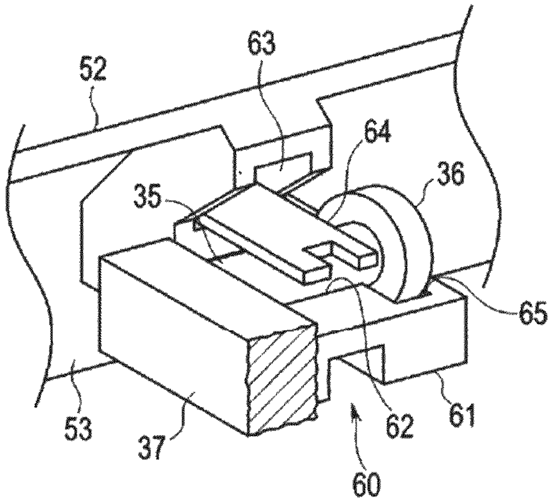
FIG. 14 is an exploded perspective view illustrating a state after the first attachment according to the modification has been fitted and fixed to the first bracket.

As illustrated in FIG. 13 and FIG. 14, the receiving block 61 of the first bracket 60 of the bracket unit 50 has a semi-disk-shaped recess 65 that engages with the head 36 of the first attachment 30.

In this way, the bar-shaped hook 35 of the first attachment 30 engages with the recess 62 of the first bracket 60 of the bracket unit 50. The recess 62 is a groove similar to an outer surface of the hook 35. The recess 62 here is also formed along the axis y parallel to the axis Y along which the hook 35 extends.

The plate spring 64 presses the hook 35 of the first attachment 30 toward the recess 62 of the receiving block 61.

In this way, the attachment structure of the onboard stereo camera unit 1 according to the present modification, in which the first attachment 30 is L-shaped, also has advantageous effects described above.

In each of the embodiment and the modification, a configuration having two (a pair of left and right) second attachments 40 and two (a pair of left and right) second brackets 70 has been described as an example. However, the number of the second attachments 40 and the number of the second brackets 70 are not limited two, and may be three or more.

The disclosure described in the above embodiment is not limited to the forms thereof, and, in addition, it is possible to carry out various modifications within the gist of the disclosure in an implementation stage. Moreover, each embodiment described above includes disclosures in various stages, and various disclosures may be extracted by appropriately combining the disclosed elements.

For example, even if some elements are omitted from all elements described in each embodiment, as long as the described problem can be solved and the described advantageous effects can be obtained, a configuration from which the elements are omitted can be extracted as a disclosure.

With an embodiment of the present disclosure, it is possible to provide an attachment structure of an onboard stereo camera unit that can be easily attached without causing displacement of the positions of two cameras relative to a vehicle body and thus improves the workability of attaching a camera unit.

The invention claimed is:

1. An attachment structure of an onboard stereo camera unit, the attachment structure comprising:

- a bracket unit configured to be attached to a vehicle;
- a camera unit configured to be mounted on the bracket unit and comprising at least a first camera device and a second camera device disposed apart from each other in a direction along a first axis;
- one fitting-fixing mechanism configured to fix the camera unit to the bracket unit, the fitting-fixing mechanism being configured to define a position of the camera unit relative to the bracket unit in a direction along a second axis orthogonal to the first axis, wherein the fitting-fixing mechanism comprises a fitting member provided in the bracket unit and a member to be fitted provided in the camera unit; and
- a first engaging-holding mechanism and a second engaging-holding mechanism configured to define a mounting posture of the camera unit by guiding the camera unit along a mounting direction during attachment and to engage and hold the camera unit when the camera unit is attached to the bracket unit,
- wherein the first engaging-holding mechanism and the second engaging-holding mechanism are disposed apart from each other in the direction along the first axis,
- wherein the first engaging-holding mechanism and the second engaging-holding mechanism are provided between the first camera device and the second camera device in the direction along the first axis,
- wherein the fitting-fixing mechanism is provided between the first engaging-holding mechanism and the second engaging-holding mechanism,
- wherein the first engaging-holding mechanism comprises a first engaging member provided in the bracket unit and a first member to be engaged provided in the camera unit,
- wherein the second engaging-holding mechanism comprises a second engaging member provided in the bracket unit and a second member to be engaged provided in the camera unit,
- wherein the first engaging member has a first hole having a first hole axis that is parallel to an optical axis of the first camera device or the second camera device,
- wherein the second engaging member has a second hole having a second hole axis that is parallel to the optical axis of the first camera device or the second camera device,
- wherein the first member to be engaged comprises a first rod that has a longitudinal axis parallel to the optical axis of the first camera device or the second camera device and that is configured to be inserted into the first hole,
- wherein the second member to be engaged comprises a second rod that has a longitudinal axis parallel to the optical axis of the first camera device or the second camera device and that is configured to be inserted into the second hole, and
- wherein the first engaging-holding mechanism and the second engaging-holding mechanism allow the camera unit to be mounted along axes parallel to optical axes of the camera devices.

2. The attachment structure of the onboard stereo camera unit according to claim 1, wherein the first engaging-holding mechanism is provided at a position corresponding to the first camera device, and wherein the second engaging-holding mechanism is provided at a position corresponding to the second camera device.

3. An attachment structure of an onboard stereo camera unit, the attachment structure comprising:

- a frame configured to be attached to a vehicle and having (i) a recess, (ii) a first hole and (iii) a second hole, the first hole being spaced apart from the second hole in a direction along a first axis, the first and second holes having hole axes that are parallel to a second axis orthogonal to the first axis, the first and second holes opening toward a first direction along the second axis;

a housing configured to hold a first camera device and a second camera device apart from each other in the direction along the first axis;

a hook disposed in the housing and configured to engage with the recess, the hook portion being configured such that, in a state where the hook portion engages with the recess, movement of the housing relative to the frame in a direction along the second axis is restricted;

a first rod disposed in the housing and protruding along the second axis toward a second direction opposite to the first direction, the first rod being positioned in the first hole in the state where the hook portion engages with the recess, the first rod being permitted to move along the second axis within the first hole and restricted from moving along the first axis and a third axis, the third axis being orthogonal to the first axis and the second axis; and a second rod disposed in the housing and protruding along the second axis toward the second direction, the second rod being positioned in the second hole in the state where the hook portion engages with the recess, the second rod being permitted to move along the second axis within the second hole and restricted from moving along the first axis and the third axis.

4. The attachment structure of the onboard stereo camera unit according to claim 3, wherein the recess is located between the first hole and the second hole in the direction along the first axis; and wherein the hook is located between the first rod and the second rod in the direction along the first axis.

5. The attachment structure of the onboard stereo camera unit according to claim 4, further comprising:

a first plate spring disposed in the bracket and configured to urge the first rod positioned in the first hole toward a third direction along the third axis; and a second plate spring disposed in the bracket and configured to urge the second rod positioned in the second hole toward the third direction.

6. The attachment structure of the onboard stereo camera unit according to claim 5, wherein the recess has a groove extending along the first axis and opening toward a fourth direction opposite to the third direction, wherein the hook includes a column configured to fit into the groove, wherein the attachment structure of the onboard stereo camera unit further comprises a third plate spring disposed in the bracket and configured to urge the column fitted in the groove toward the third direction.

7. The attachment structure of the onboard stereo camera unit according to claim 5, wherein the third direction is downward in the vehicle.

8. The attachment structure of the onboard stereo camera unit according to claim 6, wherein the third direction is downward in the vehicle.

9. The attachment structure of the onboard stereo camera unit according to claim 3, wherein an optical axis of the first camera device and an optical axis of the second camera device are parallel to the first axis.

10. The attachment structure of the onboard stereo camera unit according to claim 4, wherein an optical axis of the first camera device and an optical axis of the second camera device are parallel to the first axis.

11. The attachment structure of the onboard stereo camera unit according to claim 5, wherein an optical axis of the first camera device and an optical axis of the second camera device are parallel to the first axis.

12. The attachment structure of the onboard stereo camera unit according to claim 6, wherein an optical axis of the first camera device and an optical axis of the second camera device are parallel to the first axis.

13. The attachment structure of the onboard stereo camera unit according to claim 7, wherein an optical axis of the first camera device and an optical axis of the second camera device are parallel to the first axis.

14. The attachment structure of the onboard stereo camera unit according to claim 8, wherein an optical axis of the first camera device and an optical axis of the second camera device are parallel to the first axis.

* * * * *